US006473022B1

(12) United States Patent
Wu

(10) Patent No.: US 6,473,022 B1
(45) Date of Patent: Oct. 29, 2002

(54) MECHANICAL AND REMOTE CONTROL KEY

(76) Inventor: Sammy K. Y. Wu, 80 W. Avondale Rd., Hillsborough, CA (US) 94010

( * ) Notice: Subject to any disclaimer, the term of this patent is extended or adjusted under 35 U.S.C. 154(b) by 0 days.

(21) Appl. No.: 09/410,174

(22) Filed: Sep. 30, 1999

(51) Int. Cl.[7] .................................................. H04L 29/12

(52) U.S. Cl. ............................ 341/176; 70/336; 70/344; 340/5.6; 340/5.61; 340/5.64

(58) Field of Search .................................. 341/176, 173; 340/5.6, 5.61, 5.62, 5.64; 343/720, 872, 873; 70/336, 344, 395, 408, 413, 257, 278.2, 278.3

(56) References Cited

U.S. PATENT DOCUMENTS 4,998,952 A 3/1991 Hyatt, Jr. et al.
5,331,325 A 7/1994 Miller
5,592,169 A * 1/1997 Nakamura et al. ..... 340/825.69
5,912,512 A * 6/1999 Hayashi et al. .......... 123/179.3

* cited by examiner

*Primary Examiner*—Michael Horabik
*Assistant Examiner*—Hung Dang
(74) *Attorney, Agent, or Firm*—Jack Lo

(57) ABSTRACT

The present remote control key includes a hollow head comprised of two separable halves. A T-shaped metal socket is attached to the head. A transverse member of the socket is secured inside the head, and a longitudinal member of the socket extends outwardly through a hole at the base of the head. A proximal end of a metal shaft is inserted into a slot in the longitudinal member of the socket. The shaft is secured in the socket by a pin staked through the longitudinal member of the socket and positioned along a channel at the proximal end of the shaft. Remote control electronic components are arranged on a first circuit board inside the head, and a printed antenna is arranged on a second circuit board stacked with and electrically connected to the first circuit board.

9 Claims, 2 Drawing Sheets

MECHANICAL AND REMOTE CONTROL KEY

BACKGROUND OF THE INVENTION

1. Field of the Invention

This invention relates generally to keys with built-in remote controls.

2. Prior Art

Many automobiles are provided with door locks operable with a key, and also with a remote control built into the head of the key. Because the remote control circuitry is expensive, some remote control keys have shafts which are separable from the heads, so that the heads can be used for different vehicles by changing the shafts.

For example, U.S. Pat. No. 5,331,325 to Miller shows a key with a hollow head which houses remote control circuitry. The head is comprised of two halves that are fastened together by removable screws. A shaft is secured to an integral socket at the base of the head by some of the screws. The two halves of the head must be separated to change the shaft. Since the shaft is secured by conventional screws, it can be detached by a consumer, who might not be competent to replace key shafts. Further, the integral shaft socket on the head is made of the same material as the rest of the head, which in practice must be plastic, so that the socket is relatively weak. The head might break off from the shaft if a moderate force is applied to the head when the key is in a keyhole. Due to the small size of the circuit board inside the head, there is no room to provide a printed antenna on the circuit board. Therefore, the metal shaft is used as an antenna. The shaft is attached to the circuit board by a conductive pad on the end of a lead wire. The contact between the shaft and the pad is made without solder, so that it may corrode and reduce transmit power. The assembly of the lead wire, conductive pad, and the shaft is also relatively labor intensive.

U.S. Pat. No. 5,592,169 to Nakamura et al. shows a remote control key comprising a T-shaped shaft with a transverse member positioned in an integral socket in a hollow head. The shaft is only replaceable by disassembling the head. Also, the socket is made of the same material as the rest of the head, which must be plastic, so that the socket is too weak to hold the shaft reliably. U.S. Pat. No. 4,998,952 to Hyatt, Jr. et al. shows an electronic key with a hook-shaped proximal end wrapped around an electronic housing, which is secured by a pin extending through it and the shaft of the key. However, the odd shape of the key may reduce consumer acceptance.

OBJECTS OF THE INVENTION

Accordingly, objects of the present mechanical and remote control key are:

- to include a shaft for operating a mechanical lock;
- to include a head with remote control circuitry for operating a remote control lock;
- to enable the shaft to be detached from the head without disassembling the head;
- to prevent the shaft from being easily detached from the head by a consumer;
- to provide a strong and reliable attachment between the shaft and the head; and
- to include an internal antenna inside the head.

Further objects of the present invention will become apparent from a consideration of the drawings and ensuing description.

BRIEF SUMMARY OF THE INVENTION

The present mechanical and remote control key includes a hollow head comprised of two separable halves. A T-shaped metal socket is attached to the head. A transverse member of the socket is secured inside the head, and a longitudinal member of the socket extends outwardly through a hole at the base of the head. A proximal end of a metal shaft is inserted into a slot in the longitudinal member of the socket. The shaft is secured in the socket by a pin staked through the longitudinal member of the socket and positioned along a channel at the proximal end of the shaft. Remote control electronic components are arranged on a first circuit board inside the head, and a printed antenna is arranged on a second circuit board stacked with and electrically connected to the first circuit board.

Figure 1:
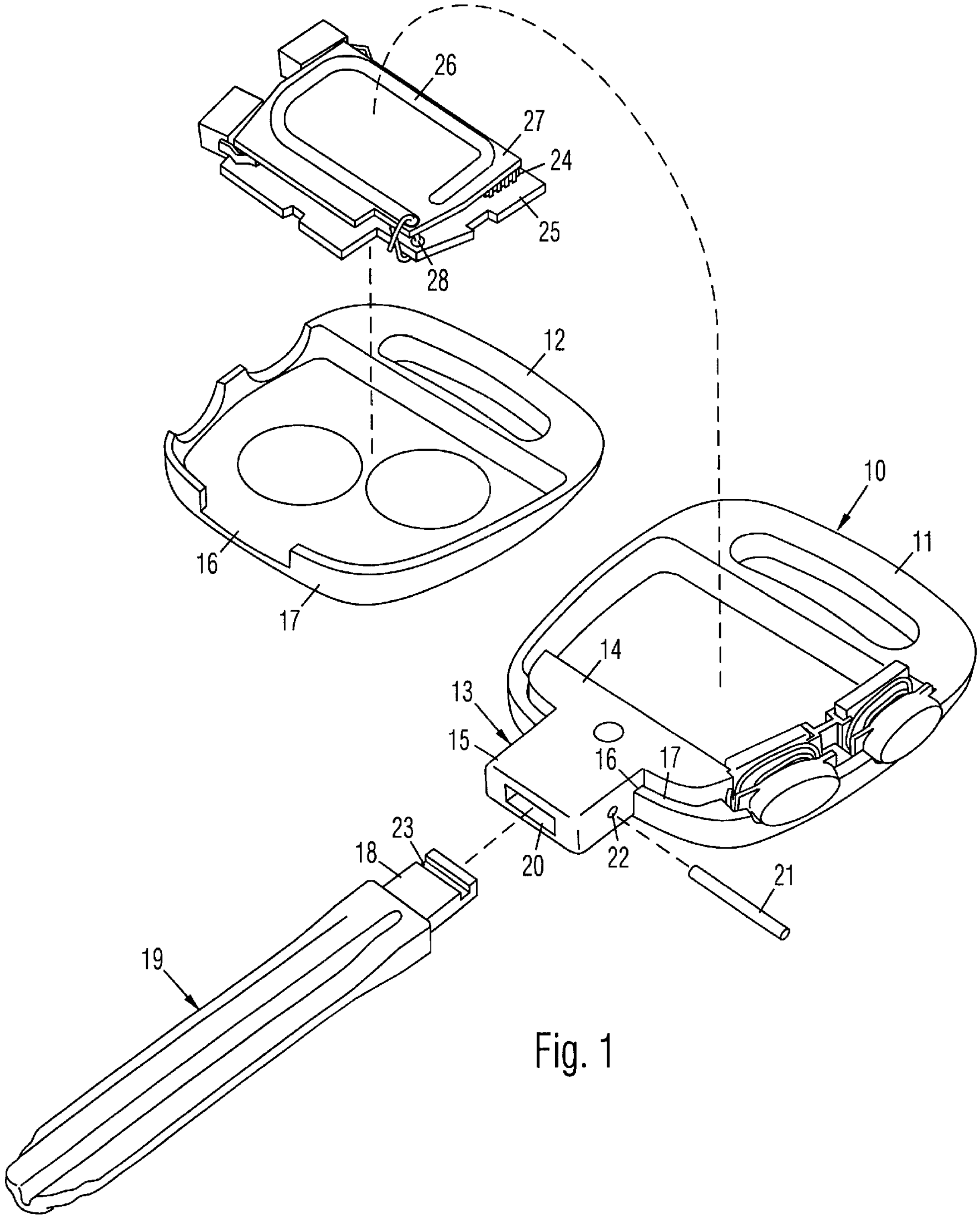
FIG. 1 is a top perspective exploded view of the present mechanical and remote control key.

| DRAWING REFERENCE NUMERALS | |
|---|---|
| 10. Head | 11. Half |
| 12. Half | 13. Metal Socket |
| 14. Transverse Member | 15. Longitudinal Member |
| 16. Hole | 17. Base |
| 18. Proximal End | 19. Metal Shaft |
| 20. Slot | 21. Pin |
| 22. Hole | 23. Channel |
| 24. Electronic Components | 25. First Circuit Board |
| 26. Printed Antenna | 27. Second Circuit Board |
| 28. Connecting Wire | |

DETAILED DESCRIPTION OF THE INVENTION

A preferred embodiment of the present mechanical and remote control key is shown in a top perspective exploded view in FIG. 1. It includes a hollow head 10 comprised of two separable halves 11 and 12 which are preferably made of plastic. A strong, generally T-shaped metal socket 13 is attached to head 10. A transverse member 14 of socket 13 is secured inside head 10, preferably by being molded into head 10 for reduced assembly cost and durability. A longitudinal member 15 of socket 13 extends outwardly through a hole 16 at a base 17 of head 10. A narrower proximal end 18 of a metal shaft 19 for operating a mechanical lock is inserted into a slot 20 in longitudinal member 15 of socket 13. Metal socket 13 is strong enough to prevent shaft 19 from breaking away even under severe abuse. Durability is further improved by distributing stress across a wide area on plastic head 10 by wide transverse member 14 of socket 13.

Shaft 19 is locked in slot 20 by a smooth pin 21 staked through a small hole 22 extending transversely between both sides of longitudinal member 15. The middle of pin 21 is positioned along a transverse channel 23 at proximal end 18 of shaft 19. Pin 21 is small enough and engaged in hole 22 tight enough to prevent it from being easily removed by a consumer, yet it is easily removed by a professional technician with the proper tool for replacing shaft 19 without disassembling head 10. Alternatively, hole 22 may extend on only one side of longitudinal member 15, so that it cannot be removed after it is inserted.

Remote control electronic components 24 are arranged on a first circuit board 25 inside head 10. An internal, printed antenna 26 is arranged on a second circuit board 27 stacked with and electrically connected to first circuit board 25 by a connecting wire 28. Internal antenna 26 is thus provided even when first circuit board 25 has no room for a printed antenna.

Figure 2:
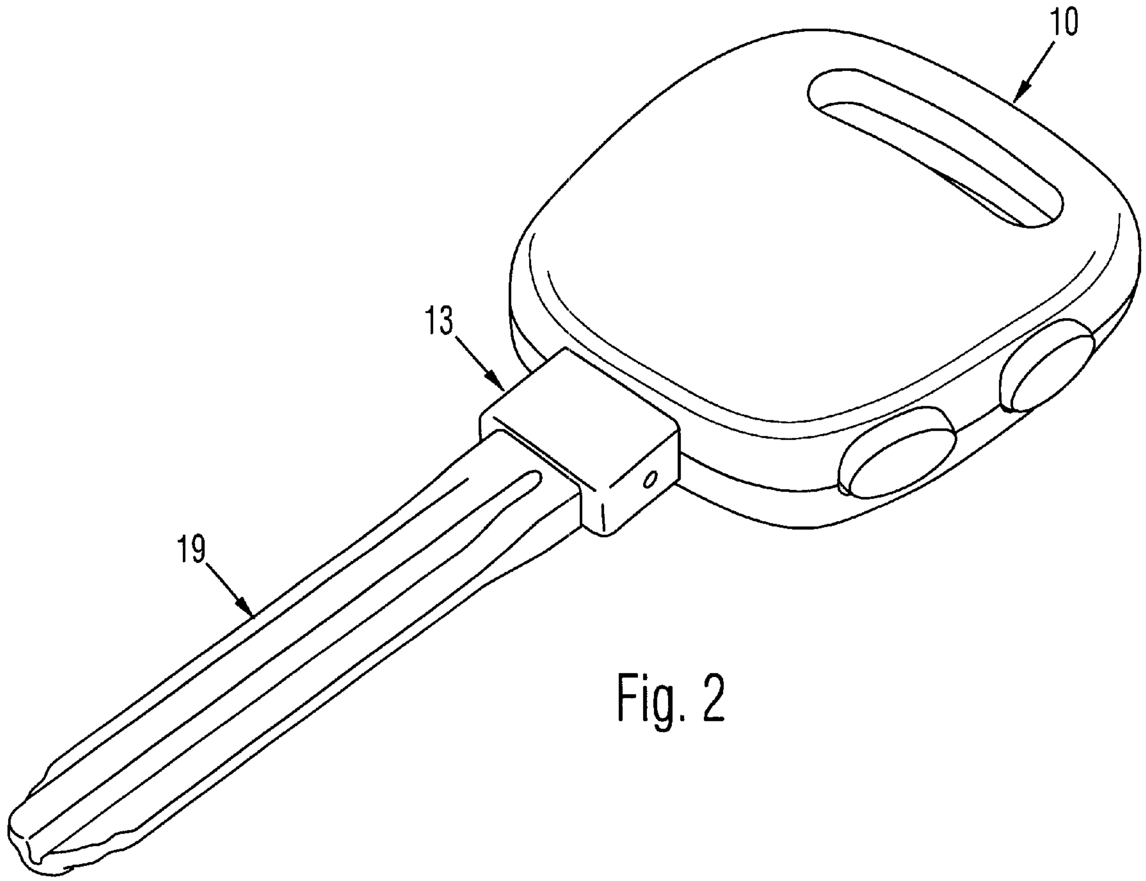
FIG. 2 is a top perspective assembled view thereof.

The remote control key is shown assembled in FIG. 2. Shaft 19 can be used for operating any type of mechanical lock, including automobile door, automobile ignition, building door, cabinets, etc. Head 10 can be used for operating any type of remote control device, including automobile door lock, garage door, etc.

SUMMARY AND SCOPE

Accordingly, the present mechanical and remote control key includes a shaft for operating a conventional mechanical lock. It includes a head with remote control circuitry for operating a remote control lock. It enables the shaft to be detach from the head without disassembling the head, yet prevents the shaft from being easily detached from the head by a consumer. It provides a strong and reliable attachment between the shaft and the head. It also includes an internal antenna inside the head.

Although the above description is specific, it should not be considered as a limitation on the scope of the invention, but only as an example of the preferred embodiment. Many variations are possible within the teachings of the invention. Therefore, the scope of the invention should be determined by the appended claims and their legal equivalents, not by the examples given.

I claim:

1. A mechanical and remote control key, comprising:

a hollow head comprising two separable halves;

a generally T-shaped metal socket attached to said head, said socket comprising a transverse member secured inside said head, a longitudinal member extending outwardly through a hole at a base of said head, and a slot extending longitudinally into said longitudinal member;

a metal shaft for operating a mechanical lock, said shaft including a proximal end removably inserted into said slot in said longitudinal member of said socket; and remote control components arranged on a circuit board received inside said head for operating a remote control lock.

2. The mechanical and remote control key of claim 1, wherein said transverse member of said socket is molded into head.

3. The mechanical and remote control key of claim 1, further including a pin inserted through a hole extending transversely into said longitudinal member on only one side thereof, so that said pin is not removable after it is inserted, a middle of said pin being positioned along a transverse channel at said proximal end of said shaft.

4. The mechanical and remote control key of claim 1, further including a pin inserted through a hole extending transversely through said longitudinal member between both sides thereof, so that said pin and said shaft are-removable without disassembling said head, a middle of said pin being positioned along a transverse channel at said proximal end of said shaft.

5. A mechanical and remote control key, comprising:

a hollow head comprising two separable halves;

a generally T-shaped metal socket attached to said head, said socket comprising a transverse member secured inside said head, a longitudinal member extending outwardly through a hole at a base of said head, and a slot extending longitudinally into said longitudinal member;

a metal shaft for operating a remote control lock, said shaft including a proximal end removably inserted into said slot in said longitudinal member of said socket;

a pin inserted through a hole extending transversely into said longitudinal member, a middle of said pin being positioned along a transverse channel at said proximal end of said shaft, said pin being removable for replacing said shaft without disassembling said head;

remote control electronic components arranged on a first circuit board inside said head for operating a remote control lock; and an internal printed antenna arranged on a second circuit board stacked with and electrically connected to said first circuit board.

6. The mechanical and remote control key of claim 5, wherein said transverse member of said socket is molded into head.

7. The mechanical and remote control key of claim 5, wherein said first circuit board and said second circuit are connected by a connecting wire.

8. The mechanical and remote control key of claim 5, wherein said hole extends transversely into only one side of said longitudinal member, so that said pin is not removable after being inserted.

9. The mechanical and remote control key of claim 5, wherein said hole extends transversely between both sides of said longitudinal member, so that said pin and said shaft are removable without disassembling said head.

* * * * *